United States Patent
Bolis et al.

(10) Patent No.: US 12,393,032 B2
(45) Date of Patent: Aug. 19, 2025

(54) ELECTRONIC DEVICES WITH LIQUID LENSES

(71) Applicant: Apple Inc., Cupertino, CA (US)

(72) Inventors: Sebastien Bolis, Crolles (FR); Arnaud Pouydebasque, Varces-Allieres-et-Risset (FR); Igor Stamenov, San Ramon, CA (US); James E. Pedder, Oxfordshire (GB); Nachiappan Chidambaram, Fontanil-Cornillon (FR)

(*) Notice: Subject to any disclaimer, the term of this patent is extended or adjusted under 35 U.S.C. 154(b) by 0 days.

(21) Appl. No.: 18/309,593

(22) Filed: Apr. 28, 2023

(65) Prior Publication Data

US 2023/0258944 A1 Aug. 17, 2023

Related U.S. Application Data

(63) Continuation of application No. PCT/US2021/057237, filed on Oct. 29, 2021.

(60) Provisional application No. 63/110,234, filed on Nov. 5, 2020.

(51) Int. Cl.
G02B 27/01 (2006.01)
G02B 3/14 (2006.01)
G02B 26/00 (2006.01)

(52) U.S. Cl.
CPC ........... G02B 27/0172 (2013.01); G02B 3/14 (2013.01); G02B 26/004 (2013.01)

(58) Field of Classification Search
CPC ..... G02B 27/0172; G02B 3/14; G02B 26/004
See application file for complete search history.

(56) References Cited

U.S. PATENT DOCUMENTS

| | | | |
|---|---|---|---|
| 6,891,682 B2 | 5/2005 | Aizenberg et al. | |
| 7,382,976 B1 | 6/2008 | Mok et al. | |
| 7,645,397 B2 | 1/2010 | Parce et al. | |
| 8,000,022 B2 | 8/2011 | Niederer | |
| 9,671,612 B2 | 6/2017 | Kress et al. | |
| 10,055,889 B2 * | 8/2018 | Bar-Zeev | G06F 3/011 |
| 11,867,927 B1 * | 1/2024 | Jacoby | G02B 27/0172 |
| 2010/0202054 A1 * | 8/2010 | Niederer | G02B 3/14 359/666 |
| 2010/0247086 A1 * | 9/2010 | Tallaron | G02B 3/14 359/666 |

(Continued)

OTHER PUBLICATIONS

Robert E. Stevens et al., A Review of Adjustable lenses for Head Mounted Displays, Proceedings of SPIE, Jun. 26, 2017, pp. 103350Q-1-103350Q-19, vol. 10335, SPIE, US.

*Primary Examiner* — Ariel A Balaoing
(74) *Attorney, Agent, or Firm* — Treyz Law Group, P.C.; Tianyi He

(57) ABSTRACT

A head-mounted device may have lenses. A user may view images through the lenses from eye boxes. The lenses may be tunable liquid lenses. Each lens may have a lens chamber. The lens chamber of the lens may have rigid and/or flexible walls that form optical lens surfaces. Actuators and/or pump and reservoir systems may deform the lens surfaces in response to control signals from a control circuit to tune the lens. Each liquid lens may have oil or other liquid in the lens chamber for that lens. Inorganic dielectric particles or other refractive-index-adjustment particles may be used to adjust the refractive index of the lens. The particles may be subwavelength in size.

21 Claims, 4 Drawing Sheets

(56) References Cited

U.S. PATENT DOCUMENTS

| | | | |
|---|---|---|---|
| 2011/0149406 A1* | 6/2011 | Tsuji | G02B 3/14 |
| | | | 359/665 |
| 2011/0188127 A1 | 8/2011 | Yamamoto et al. | |
| 2012/0002163 A1* | 1/2012 | Neal | G02B 13/22 |
| | | | 351/239 |
| 2012/0006783 A1* | 1/2012 | Pouydebasque | F04B 43/043 |
| | | | 216/33 |
| 2012/0092775 A1* | 4/2012 | Duston | G02B 26/004 |
| | | | 359/666 |
| 2016/0202455 A1* | 7/2016 | Aschwanden | G02B 13/0075 |
| | | | 359/666 |
| 2016/0357010 A1* | 12/2016 | Bolis | G02B 5/005 |
| 2017/0276944 A1* | 9/2017 | Kim | G02B 26/007 |
| 2019/0025575 A1* | 1/2019 | Wai | G02B 3/12 |
| 2019/0243123 A1* | 8/2019 | Bohn | G02B 6/122 |
| 2019/0302479 A1* | 10/2019 | Smyth | G02B 26/0875 |
| 2019/0369303 A1* | 12/2019 | Zhao | G02B 7/04 |
| 2021/0055689 A1* | 2/2021 | Leibovici | G03H 1/04 |
| 2021/0132267 A1* | 5/2021 | Hernández | G02B 27/0172 |
| 2023/0375856 A1* | 11/2023 | Shan | G02C 7/108 |

* cited by examiner

ELECTRONIC DEVICES WITH LIQUID LENSES

This application is a continuation of international patent application No. PCT/US2021/057237, filed Oct. 29, 2021, which claims priority to U.S. provisional patent application No. 63/110,234, filed Nov. 5, 2020, which are hereby incorporated by reference herein in their entireties.

FIELD

This relates generally to electronic devices, and, more particularly, to electronic devices with displays and lenses.

BACKGROUND

Electronic devices such as head-mounted devices may have lenses. For example, a head-mounted device may have lenses that allow a user to view images.

SUMMARY

A head-mounted device may have lenses. A user may view images through the lenses from eye boxes. For example, the head-mounted device may have a left display that presents a left image to a left eye box through a left lens and a right display that presents a right image to a right eye box through a right lens.

The lenses of a head-mounted device may include tunable liquid lenses. Each lens may have a lens chamber filled with liquid. The lens chamber may have rigid and/or flexible walls that form optical lens surfaces. Actuators and/or pump and reservoir systems may deform the lens surfaces in response to control signals from a control circuit to tune the lens.

Inorganic dielectric particles or other refractive-index-adjustment particles may be used to adjust the refractive index of the liquid in the lens chamber and thereby adjust the refractive index of the lens. The particles may be subwavelength in size.

DETAILED DESCRIPTION

An electronic device such as a head-mounted device may have a head-mounted support structure that supports lenses and other components. The head-mounted support structure may be configured to form a pair of glasses (e.g., lightweight eyewear), a pair of goggles, a helmet, or other head-mounted device.

During operation, a user may view visual content such as virtual reality content or augmented reality content through the lenses of the head-mounted device. To accommodate users with different types of vision (nearsightedness, farsightedness, etc.) and/or to display images at different image distances (e.g., to create virtual images in different image planes), the lenses may be tunable liquid lenses.

Figure 1:
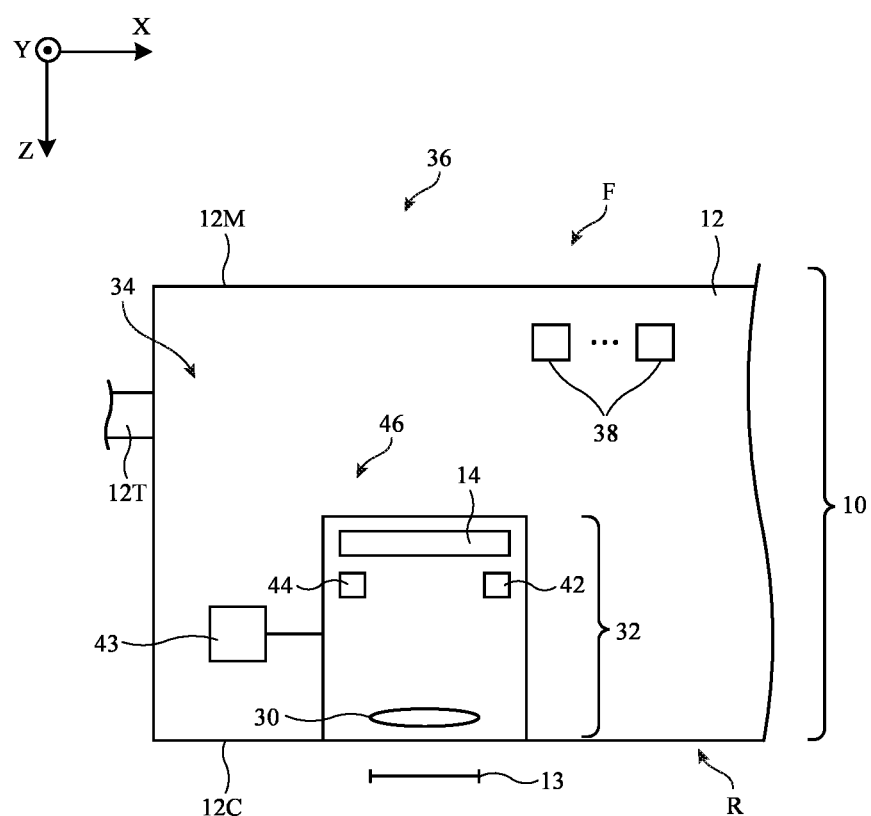
FIGS. 1 and 2 are top views of illustrative head-mounted devices in accordance with embodiments.

FIG. 1 is a top view of an illustrative head-mounted device such as a pair of googles that has liquid lenses and displays for displaying content for a user.

As shown in FIG. 1, head-mounted devices such as electronic device 10 may have head-mounted support structures such as housing 12. Housing 12 may include portions (e.g., support structure 12T) to allow device 10 to be worn on a user's head. Support structure 12T may be formed from fabric, polymer, metal, and/or other material. Support structure 12T may form a strap or other head-mounted support structure to help support device 10 on a user's head. A main head-mounted support structure (e.g., main housing portion 12M) of housing 12 may support electronic components such as display 14. There may be left and right displays 14 in device 10. In the example of FIG. 1, a left display for a user's left eye is shown as an example.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, glass, metal, fabric, leather, or other materials. The walls of housing portion 12M may enclose internal components 38 in interior region 34 of device 10 and may separate interior region 34 from the environment surrounding device 10 (exterior region 36).

Internal components 38 may include integrated circuits, actuators, batteries, sensors, control circuitry, and/or other circuits and structures for device 10. Control circuitry in components 38 may, as an example, be used to adjust tunable lenses and other components.

If desired, components 38 may include sensors such as image sensors, ambient light sensors, touch sensors, force sensors, orientation sensors (e.g., orientation sensors based on accelerometers, compasses, and/or gyroscopes such as orientation sensors based on inertial measurement units containing some or all of these components), proximity sensors, capacitive sensors, optical sensors, three-dimensional image sensors such as structured light sensors and/or three-dimensional sensors based on stereoscopic pairs of two-dimensional image sensors, gaze tracking sensors, hand sensors, sensors for monitoring the movement and position of accessories such as controllers, microphones for gathering voice commands and measuring ambient noise, temperature sensors, fingerprint sensors and other biometric sensors, and/or other sensing circuitry. Sensors and other input-output circuitry may be used in gathering environmental information, user input, and/or other data that is used in controlling the operation of device 10.

Front face F of housing 12 may face outwardly away from a user's head and face. Opposing rear face R of housing 12 may face the user. Portions of housing 12 (e.g., portions of main housing 12M) on rear face R may form a cover such as cover 12C. The presence of cover 12C on rear face R may help hide internal housing structures, internal components 38, and other structures in interior region 34 from view by a user.

Device 10 may have left and right optical modules 40. A left optical module and associated left eye box 13 are shown in the left portion of device 10 of FIG. 1. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14 mounted in a respective support structure 32. Support structures 32, which may sometimes be referred to as lens barrels, lens support structures, optical component support structures, or optical module support structures, may include hollow cylindrical structures with open ends or other supporting structures to house displays 14 and lens components. Support structures 32 may, for example, include a left lens barrel that supports a left display 14 and left lens 30 and a right lens barrel that supports a right display 14 and right lens 30.

Lenses 30 may have any suitable size and weight. With an illustrative configuration, the lateral dimensions (e.g., the diameters) of each lens 30 may be at least 0.5 cm, at least 1 cm, at least 1.5 cm, at least 2 cm 1-6 cm, less than 10 cm, less than 8 cm, less than 4 cm, 2-10 cm, 2-8 cm, 2-15 cm, or other suitable lateral dimensions and the weight of each lens 30 may be at least 3 grams, at least 10 grams, at least 25 grams, at least 50 grams, less than 200 grams, less than 100 grams, less than 60 grams, 5-20 grams, 3-10 grams, or other suitable weight.

Lenses 30 may be mounted to support structures 32. Each lens 30 may include one or more lens elements including one or more tunable liquid lenses. The lenses may be adjusted to accommodate a user's vision defects (nearsightedness, farsightedness, etc.) and/or may be adjusted to place the image that are being displayed by displays 14 at desired virtual image distances from eye boxes 13.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light sources 44 (e.g., light-emitting diodes, lasers, etc.).

Cameras 42 and light sources 44 may operate at any suitable wavelengths (visible, infrared, and/or ultraviolet). With an illustrative configuration, which may sometimes be described herein as an example, light sources 44 emit infrared light that is invisible (or nearly invisible) to the user. The emitted light may, as an example, be near infrared light at a wavelength of 740 nm to 1000 nm, 940 nm, 850 nm to 1000 nm, or other suitable near infrared wavelength. This allows eye monitoring operations to be performed continuously without interfering with the user's ability to view images on displays 14. Light sources 44 may, for example, include multiple light-emitting diodes or lasers arranged in a ring around the periphery of support structure 32. During operation, emitted infrared light from light sources 44 may pass through lenses 30 to illuminate the user's eyes (e.g., as flood illumination and/or glints) and cameras 42 may capture infrared images of the user's illuminated eyes through lenses 30.

Not all users have the same interpupillary distance. To provide device 10 with the ability to adjust the interpupillary spacing between modules 40 along lateral dimension X and thereby adjust the spacing between left and right eye boxes 13 to accommodate different user interpupillary distances, device 10 may be provided with actuators 43 (e.g., left and right actuators or a common actuator that adjusts the position of both left and right optical modules). Actuators 43 can be manually controlled and/or actuators 43 may be computer-controlled actuators (e.g., computer-controlled motors) that are used to move support structures 32 relative to each other. Information on the locations of the user's eyes may be gathered using, for example, cameras 42. The locations of eye boxes 13 can then be adjusted accordingly.

Device 10 of FIG. 1 may be operated as a stand-alone device and/or the resources of device 10 may be used to communicate with external electronic equipment. As an example, communications circuitry in device 10 may be used to receive user input information from an external controller and may be used to receive video and/or audio content from external equipment.

Figure 2:
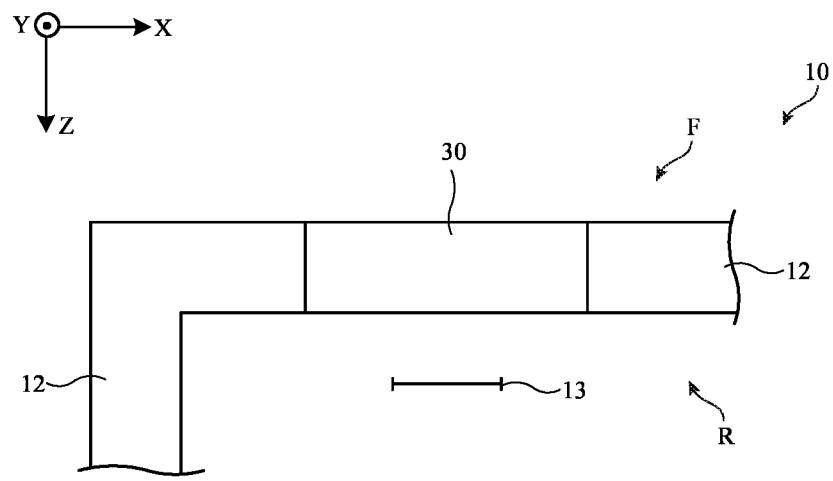

If desired, head-mounted device 10 may be a pair of glasses. As shown in FIG. 2, for example, housing 12 of device 10 may be configured to form a glasses frame (e.g., left and right temples and end pieces, a nose bridge, lens rims, etc.). In this type of arrangement, left and right tunable lenses such as lenses 30 may be supported in the glasses frame (e.g., housing 12 of FIG. 2) aligned with respective eye boxes 13. A user may view real-world objects through lenses 30 of device 10 of FIG. 2 from eye boxes 13. Housing 12 may include control circuitry, sensors, and other circuitry for controlling the operation of device 10 (see, e.g., components 38 of FIG. 1).

Device 10 of FIG. 2 may be free of displays or may contain displays. In configurations in which device 10 does not contain displays, device 10 may serve as a pair of tunable glasses and may have speakers for presenting audio to a user. In configurations in which device 10 contains displays, the displays may be used to display visual content (e.g., augmented reality content) that is viewable when the user's eyes are in eye boxes 13. As an example, a scanning mirror device, liquid-crystal-on-silicon display, digital mirror display, or other display may be used to provide an image to a waveguide that overlaps lens 30. The waveguide may convey the image to a location on lens 30 that overlaps eye box 13. An output coupler on the waveguide (e.g., a holographic output coupler) may couple the image out of the waveguide towards eye box 13. In this way, images may be displayed for the user's left and right eyes while the glasses are being worn on the user's head. Lenses 30 of device 10 of FIG. 2 may be tuned dynamically to accommodate the vision needs of different users, to adjust the image planes of displayed images, and/or to otherwise adjust the optical system of device 10.

Devices such as illustrative electronic devices 10 of FIGS. 1 and 2 and/or other head-mounted devices may have tunable liquid lenses. Tunable liquid lenses contain a fluid such as liquid silicone or other clear liquid (sometimes referred to as oil) in lens chambers formed from rigid members (e.g., dome-shaped layers and/or planar layers) and/or flexible membranes.

Figure 3:
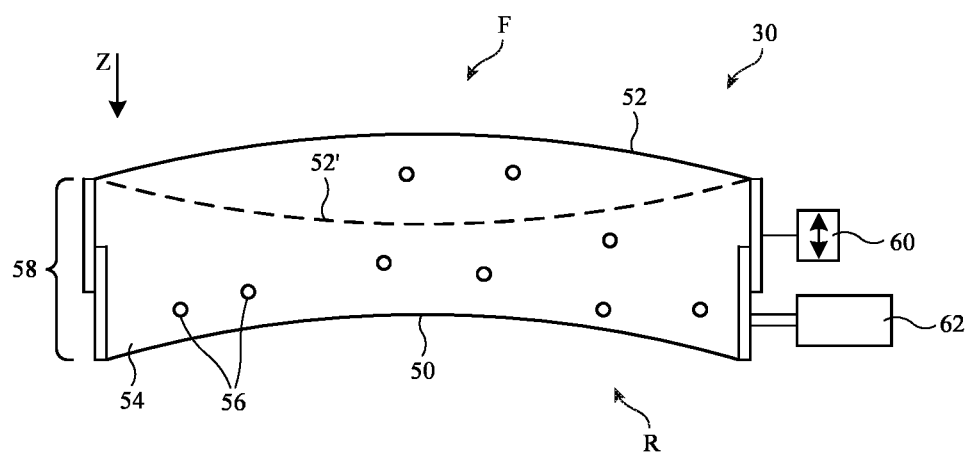
FIG. 3 is a cross-sectional view of an illustrative liquid lens in accordance with an embodiment.

An illustrative tunable liquid lens is shown in FIG. 3. As shown in the example of FIG. 3, lens 30 may have a chamber defined by optical lens surface walls such as lower (inner)

chamber wall 50 facing rear face R (the +Z direction) and an opposing upper (outer) chamber wall 52 facing front face F (the −Z direction). Lens walls (sometimes referred to as chamber walls, optical surface walls, lens optical surface walls, lens chamber optical surface walls, lens chamber layers, optical surface layers, etc.) such as walls 50 and 52 may be formed from transparent materials such as polymer and may include rigid and/or flexible portions. Wall 50 may be, for example, a rigid dome-shaped wall (e.g., a dome-shaped rigid polymer layer that forms a concave lens surface) and wall 52 may be, for example, a flexible lens chamber membrane. These walls and additional lens chamber walls such as sidewall structures 58 may form a hollow liquid lens chamber that is filled with liquid 54 (e.g., oil) having optional refractive-index-adjustment particles such as particles 56. In an illustrative configuration, wall 50 may be a rigid dome and wall 52 may be a flexible membrane. The outer walls of the lens chamber that are used in forming the optical surfaces of lens 30 may be convex, planar, or concave. In the example of FIG. 3, the inner optical surface of lens 30 is concave and outer optical surface of lens 30 has a shape that is dynamically adjusted (e.g., to various concave and/or convex shapes).

To adjust lens 30 (e.g., to change the shape of the lens chamber containing liquid 54 and thereby change the focal length and/or other optical properties of lens 30), liquid 54 may be pumped into and/or out of the lens chamber using pump and liquid reservoir system 62 and/or the lens chamber for lens 30 may be adjusted using one or more electrically controlled actuators 60 under control from control circuitry in device 10. A liquid pump for system 62 may be formed from piezoelectric pumping elements, electromechanical pump devices, and/or other pump components. Actuators 60 may be piezoelectric actuators, electromechanical actuators (e.g. solenoids, etc.), and/or other actuators for moving lens chamber structures and/or otherwise deforming the shape of the lens chamber containing liquid 54 and thereby adjusting the shape and optical properties of lens 30.

Consider, as an example, the use of system 62 to adjust the amount of liquid in the liquid chamber formed by sidewall structure 58 and walls 52 and 50. By removing or adding liquid to lens 30, wall 52 (e.g., a flexible membrane) may be forced outwardly (in the −Z direction) or inwardly (in the +Z direction), respectively. Lens chamber sidewalls such as walls 58 may have shapes (e.g., heights) that can be adjusted. Walls 58 may, as an example, have an upper ring-shaped wall portion that is coupled to wall 52 and that slides over a mating lower ring-shaped wall portion that is coupled to wall 50. By sliding these chamber wall portions relative to each other or otherwise deforming the shape of the chamber for the liquid in lens 30, the volume of the chamber may be adjusted, thereby exerting inward or outward pressure on walls 52 and 50. For example, when actuators 60 shorten sidewall structures 58 of FIG. 3, outward pressure may be exerted on membrane 52 (e.g., to increase the curvature of membrane 52). When actuators 60 increase the height of sidewall structures 58 of FIG. 3, the liquid pressure in lens 30 is reduced, forcing membrane 52 towards concave position 52'. These chamber deformations and/or other actuator-driven chamber shape changes can be used to adjust the shape of lens 30 (e.g., to adjust the lens power of lens 30 to a desired positive or negative value). Wall 50 may be sufficiently rigid to resist deflection as wall 52 is being adjusted in this way or, if desired, a flexible membrane material may be used in forming some or all of wall 50.

Figure 4:
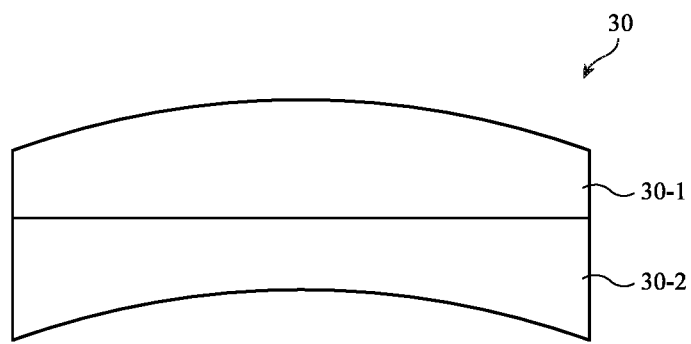
FIG. 4 is a cross-sectional view of an illustrative multi-chamber liquid lens in accordance with an embodiment.

Another illustrative tunable liquid lens arrangement is shown in FIG. 4. In the example of FIG. 4, lens 30 has multiple chambers. In particular, lens 30 of FIG. 4 has an upper lens element 30-1 and a lower lens element 30-2. If desired, one of these lens elements may be fixed (e.g., a fixed lens element formed from glass, polymer, crystalline material such as sapphire, etc. In another illustrative configuration, lens elements 30-1 and 30-2 are both tunable liquid lens elements and each have a corresponding independently adjustable liquid-filled chamber containing liquid. The walls of the chambers of lens 30 may be rigid and/or flexible. For example, the outermost walls of lens 30 of FIG. 4 may be flexible membranes and the wall separating lens elements 30-1 and 30-2 may be a planner or curved rigid member. The walls of elements 30-1 and 30-2 may be convex, concave, and/or planar.

In arrangements such as these in which lens 30 has two (or more) chambers, the material of each chamber may be selected independently. For example, lens elements 30-1 and 30-2 may be configured to form an achromatic doublet to help minimize chromatic and spherical aberrations. Refractive-index-adjustment-particle-filled oil and/or other liquids in elements 30-1 and 30-2 may, as an example, have different amounts of chromatic dispersion (change in refractive index as a function of wavelength) and respective shapes that allow the lens elements to exhibit complementary (cancelling) chromatic aberration.

In scenarios in which the liquids of elements 30-1 and 30-2 are formed from oil containing refractive-index-adjustment particles, as an example, the material of the particles, the density of the particles, and/or the type of oil that is used may differ between elements 30-1 and 30-2 in order implement a desired achromatic doublet lens design or other desired lens design. The lens surfaces of each of the elements in lens 30 may be spherical and/or aspherical and may be planar, may be convex, may be concave, or may have a mixture of planer surfaces, convex surfaces, and/or concave surfaces. In multi-chamber configurations of the type shown in FIG. 4, each chamber may have a corresponding set of one or more actuators 60 and/or one or more pump and reservoir systems 62 (FIG. 3) so that control circuitry in device 10 can adjust each chamber independently (if desired).

Any suitable materials may be used in forming liquid lens chamber walls and liquid for filing the liquid lens chambers for lenses 30. In general, materials with low opacity and low haze may help enhanced optical performance. In an illustrative embodiment, light transmission for each lens 30 is at least 90%, at least 95%, at least 97%, or at least 98% (e.g., for visible light wavelengths of 380-740 nm and near infrared wavelengths of 740-1000 nm, as an example) and the haze of lens 30 is less than 2%, less than 1%, less than 0.5%, or other suitable value (e.g., from 380 nm to 1000 nm or other suitable wavelength range). This allows visible light associated with real-world images and/or images from displays 14 to pass through lenses 30 and allows infrared light from light sources 44 and infrared light to be detected by cameras 42 to pass through lenses 30.

Clear materials for the lens chamber structures include polymer, glass, transparent ceramic, and crystalline materials such as sapphire. In an illustrative configuration, the materials forming lens chamber membranes and other lens chamber structures (e.g., optical lens surfaces) may be formed from a transparent polymer. Examples of rigid polymer that may be used in forming rigid lens walls include epoxy, polycarbonate, and polymethyl methacrylate (as examples). Flexible polymer for forming lens membranes may exhibit a low modulus of elasticity (e.g., less than 5 MPa, less than 2 MPa, less than 1 MPa, less than 0.5 MPa, or other suitable elastic modulus value). An example of a flexible polymer for forming the flexible walls of lenses 30 is silicone (e.g., polydimethylsiloxane). Another illustrative polymer that may be used in lenses 30 (e.g., for a flexible membranes) is cyclic olefin polymer. In general, any suitable lens chamber wall materials (e.g., materials for flexible membranes, rigid layers, sidewall structures, etc.) may be used.

Lens liquid 54 may be an oil that is compatible with the lens chamber materials of lens 30. Examples of oils that may be used for liquid 54 include phenylmethyl siloxane, multiply-alkylated cyclopentane, polyphenyl ether, and silicone oil. The viscosity of lens liquid 54 may be 100-1600 mPas, at least 0.1 mPas, at least 1 mPas, at least 5 mPas, at least 50 mPas, at least 100 mPas, less than 10,000 mPas, less than 4000 mPas, less than 2500 mPas, less than 1600 mPas, less than 1000 mPas, less than 200 mPas, less than 75 mPas, or other suitable viscosity (as examples).

The refractive index of liquid 54 (and therefore the refractive index of lens 30) may be at least 1.35, at least 1.4, at least 1.5, at least 1.6, 1.6-1.8, at least 1.65, 1.65-1.75, less than 2, less than 1.9, less than 1.8, or other suitable refractive index values (at 500 nm or other suitable wavelength). During operation, the shape of lenses 30 may be changed to change the power of lenses 30. The power of lenses 30 may vary, as an example, between −11D and +7 D or other suitable values. Larger refractive index values allow lens power changes such as these to be accomplished with less actuator travel than with lower refractive index values. To help raise the refractive index of liquid 54 to a desired elevated value, refractive-index-adjustment particles such as particles 56 of FIG. 3 may be incorporated into liquid 54. Refractive-index-adjustment particles such as particles 56 may be inorganic particles such as particles of metal oxides (as an example). The refractive index of particles 56 may be, for example, at least 1.7, at least 1.8, at least 1.9, at least 2.0, at least 2.1, 1.8-2.2, 2.0-2.2, less than 2.3, or other suitable refractive index value (e.g., at 500 nm or other suitable wavelength). Examples of inorganic materials that may be used in forming particles 56 include titanium oxide, niobium oxide, tantalum oxide, zirconium oxide, magnesium oxide, and silicon nitride. Other refractive-index-adjustment materials may be used in forming particles 56, if desired.

To reduce the risk of light scattering from particles 56 that might produce haze in lens 30, the size of particles 56 (e.g., the average lateral dimensions of particles 56, sometimes referred to as average particle diameter) may be subwavelength (e.g., less than 300 nm, less than 150 nm, less than 100 nm, less than 70 nm, less than 50 nm, less than 30 nm, less than 15 nm, less than 7 nm, 3-300 nm, 3-20 nm, 2-8 nm, 20-300 nm, 10-100 nm, or other suitable size). Particles 56 with subwavelength sizes may sometimes be referred to as nanoparticles.

Smaller particle sizes and more tightly controlled ranges of particle size distributions may tend to exhibit reduced haze. In an illustrative configuration, the average size of particles 56 is 5 nm or other value between 2.5 and 10 nm. The use of small particles such as these may help reduce haze and ensure satisfactory high light transmission through lens 30. In some embodiments, the distribution of sizes of particles 56 in lens 30 may be limited. As an example, lens 30 may have particles 56 characterized by a relatively narrow size range in which at least 90% (or at least 70% or other suitable amount) of all particles 56 in liquid 54 have sizes that vary by less than +/−20%, less than +/−40%, or less than +/−60% from the average particle size.

Particles 56 may be included in liquid 54 at any suitable density level. For example, the fraction by weight of particles 56 in liquid 54 may be at least 10%, at least 30%, at least 60%, at least 80%, at least 90%, less than 95%, less than 75%, 40-95%, 80-95%, or other suitable concentration. The material used in forming particles 56 and the size of particles 56 may be selected to help reduce aging effects (e.g., agglomeration, reaction with liquid 54, etc.). In an illustrative configuration, liquid 54 that contains particles 56 does not change viscosity with age (e.g., the viscosity changes by less than 1% over at least 1 year, at least 2 years, etc.).

In accordance with an embodiment, a head-mounted device is provided that includes a head-mounted support structure; control circuitry; and a tunable liquid lens that is configured to be adjusted by the control circuitry, the tunable liquid lens includes a lens chamber having lens chamber walls that form optical lens surfaces; liquid in the lens chamber; and refractive-index-adjustment particles in the liquid that are configured to change a refractive index for the liquid.

In accordance with another embodiment, the lens includes actuator circuitry that is controlled by the control circuitry to adjust a lens chamber wall shape of at least one of the lens chamber walls to tune the lens.

In accordance with another embodiment, the lens includes a liquid pump and reservoir system coupled to the lens chamber.

In accordance with another embodiment, the lens chamber walls include a flexible lens membrane.

In accordance with another embodiment, the flexible lens membrane includes silicone.

In accordance with another embodiment, the lens chamber walls include a rigid dome and a flexible membrane on opposing surfaces of the lens chamber.

In accordance with another embodiment, the refractive-index-adjustment particles include inorganic particles.

In accordance with another embodiment, the refractive-index-adjustment particles includes particles selected from the group consisting of: titanium oxide, niobium oxide, tantalum oxide, zirconium oxide, magnesium oxide, and silicon nitride.

In accordance with another embodiment, the refractive-index-adjustment particles have an average diameter of less than 100 nm.

In accordance with another embodiment, the refractive-index-adjustment particles have an average diameter of 3-20 nm.

In accordance with another embodiment, the refractive-index-adjustment particles have an average size of 3-20 nm and at least 70% of the refractive-index-adjustment particles have sizes that are within +/−50% of the average size.

In accordance with another embodiment, the liquid includes oil.

In accordance with another embodiment, the liquid has a viscosity of 0.1-50 mPas.

In accordance with another embodiment, the liquid includes a liquid selected from the group consisting of: phenylmethyl siloxane, multiply-alkylated cyclopentane, polyphenyl ether, and silicone oil.

In accordance with another embodiment, at least one of the lens chamber walls includes a material selected from the group consisting of: epoxy, polycarbonate, polymethyl methacrylate, polydimethylsiloxane, and cyclic olefin polymer.

In accordance with another embodiment, rein the tunable liquid lens includes an achromatic doublet.

In accordance with another embodiment, the tunable liquid lens has a refractive index of 1.6 to 1.8.

In accordance with another embodiment, the tunable liquid lens has a refractive index of 1.65 to 1.75.

In accordance with another embodiment, the fraction by weight of the refractive-index-adjustment particles in the liquid is 40-95%.

In accordance with another embodiment, the head-mounted device includes a display configured to display an image viewable through the tunable liquid lens from an eye box.

In accordance with an embodiment, a tunable liquid lens is provided that includes a lens chamber having lens chamber walls; liquid in the lens chamber; and inorganic dielectric particles having an average diameter of less than 50 nm in the liquid.

In accordance with another embodiment, the fraction by weight of the inorganic dielectric particles in the liquid is 40-95% and the lens has a diameter of 2-15 cm.

In accordance with an embodiment, a head-mounted device is provided that includes a head-mounted support structure; a display that is coupled to the head-mounted support structure and that is configured to produce an image; and a tunable liquid lens through which the image is visible from an eye box, the tunable liquid lens includes a lens chamber having a flexible membrane; liquid in the lens chamber; and refractive-index-adjustment particles in the liquid that are configured to change a refractive index for the liquid.

In accordance with another embodiment, the refractive-index-adjustment particles have an average diameter of 3-20 nm.

The foregoing is merely illustrative and various modifications can be made to the described embodiments. The foregoing embodiments may be implemented individually or in any combination.

What is claimed is:

1. A head-mounted device, comprising:
   a head-mounted support structure;
   control circuitry; and
   a tunable liquid lens that is configured to be adjusted by the control circuitry, wherein the tunable liquid lens comprises:
   a lens chamber having lens chamber walls that form optical lens surfaces, wherein the lens chamber walls include a flexible lens membrane and sidewall structures and wherein the sidewall structures comprise an upper sidewall portion coupled to the flexible lens membrane and a lower sidewall portion configured to mate with the upper sidewall portion;
   liquid in the lens chamber; and
   refractive-index-adjustment particles in the liquid that are configured to change a refractive index for the liquid, wherein the control circuitry is configured to adjust the tunable liquid lens based on a relative movement between the upper and lower sidewall portions that adjusts a height of the sidewall structures.

2. The head-mounted device defined in claim 1 wherein the tunable liquid lens further comprises actuator circuitry that is controlled by the control circuitry to adjust a lens chamber wall shape of at least one of the lens chamber walls to tune the tunable liquid lens.

3. The head-mounted device defined in claim 1 wherein the flexible lens membrane comprises silicone.

4. The head-mounted device defined in claim 1 wherein the lens chamber walls include a rigid dome.

5. The head-mounted device defined in claim 1 wherein the refractive-index-adjustment particles comprise inorganic particles.

6. The head-mounted device defined in claim 1 wherein the refractive-index-adjustment particles comprises particles selected from the group consisting of: titanium oxide, niobium oxide, tantalum oxide, zirconium oxide, magnesium oxide, and silicon nitride.

7. The head-mounted device defined in claim 1 wherein the refractive-index-adjustment particles have an average diameter of less than 100 nm.

8. The head-mounted device defined in claim 1 wherein the refractive-index-adjustment particles have an average diameter of 3-20 nm.

9. The head-mounted device defined in claim 1 wherein the refractive-index-adjustment particles have an average size of 3-20 nm and wherein at least 70% of the refractive-index-adjustment particles have sizes that are within +/−50% of the average size.

10. The head-mounted device defined in claim 1 wherein the liquid comprises oil.

11. The head-mounted device defined in claim 1 wherein the liquid has a viscosity of 0.1-50 mPas.

12. The head-mounted device defined in claim 1 wherein the liquid comprises a liquid selected from the group consisting of: phenylmethyl siloxane, multiply-alkylated cyclopentane, polyphenyl ether, and silicone oil.

13. The head-mounted device defined in claim 1 wherein at least one of the lens chamber walls comprises a material selected from the group consisting of: epoxy, polycarbonate, polymethyl methacrylate, polydimethylsiloxane, and cyclic olefin polymer.

14. The head-mounted device defined in claim 1 wherein the tunable liquid lens comprises an achromatic doublet.

15. The head-mounted device defined in claim 1 wherein the tunable liquid lens has a refractive index of 1.6 to 1.8.

16. The head-mounted device defined in claim 1 wherein the tunable liquid lens has a refractive index of 1.65 to 1.75.

17. The head-mounted device defined in claim 1 wherein a fraction by weight of the refractive-index-adjustment particles in the liquid is 40-95%.

18. The head-mounted device defined in claim 1 further comprising a display configured to display an image viewable through the tunable liquid lens from an eye box.

19. A head-mounted device, comprising:
   a head-mounted support structure;
   a display that is coupled to the head-mounted support structure and that is configured to produce an image; and
   a tunable liquid lens through which the image is visible from an eye box, wherein the tunable liquid lens comprises:
   a lens chamber having a flexible membrane, a wall opposite the flexible member, and sidewalls, wherein the sidewalls have an upper wall portion coupled to the flexible member and a lower wall portion coupled to the wall that mates with the upper wall portion;
   liquid in the lens chamber; and
   refractive-index-adjustment particles in the liquid that are configured to change a refractive index for the liquid, wherein the upper wall portion is configured to slide relative to the lower wall portion to adjust the flexible member between a convex position and a concave position.

20. The head-mounted device defined in claim 19 wherein the upper wall portion comprises a ring-shaped wall portion.

21. The head-mounted device defined in claim 1 further comprising:
   a liquid pump and reservoir system coupled to the lens chamber.

* * * * *